United States Patent Office 2,881,091
Patented Apr. 7, 1959

2,881,091
METHOD AND MANNER OF PROTECTING GALVANIZED SURFACES AGAINST CORROSION

Robert E. Schulze, Deerfield, Ill., assignor to Culligan, Inc., Northbrook, Ill., a corporation of Delaware No Drawing. Application July 25, 1955
Serial No. 524,284

9 Claims. (Cl. 117—71)

The present invention relates to a novel process or method of protecting a galvanized surface against corrosion, and more particularly to a novel process or method of coating the interior surfaces of galvanized tanks to increase their resistance to corrosion.

Among the objects of the present invention is the provision of a novel method and manner of coating and protecting a galvanized surface or the interior of a closed galvanized tank to increase the corrosion resistance of said coated surface or surfaces and thereby greatly prolong their useful life.

Another object of the present invention is the provision of a novel method of protecting a galvanized surface including the steps of roughening the surface to be coated, applying a primer base coat to the roughened surface, applying a finishing material thereto and curing said material.

A further object of the present invention is to provide a novel method for and manner of protecting the interior surfaces of a galvanized tank against corrosion comprising the steps of roughening the surfaces to be treated and thereby removing oxide films from such surfaces and providing a greater surface area for paint adhesion, applying to these roughened surfaces a primer base consisting of granules or atomized particles of aluminum suspended in a vehicle of vinyl, applying a finishing material containing polymerizable solids and a pigment, and curing the finishing material.

The present invention further comprehends the provision of a novel manner of treating and coating a galvanized surface to greatly enhance its ability to resist corrosive influences to which said surface may be subjected in use.

In the process of the present invention whereby the galvanized surface, such as the interior of a galvanized tank, is subjected to a protective coating to increase its corrosion resistance, the surface to be treated is initially roughened to remove any oxide films and to create or provide a greater surface area for paint adhesion. Such roughening may be accomplished by the forcible impact of grit blasting particles.

When the surface being treated or roughened has been thoroughly cleaned of any grit blasting particles, a primer coat is next applied to the cleaned and roughened surface. This primer preferably consists of granules of a non-leafing type aluminum providing an active filler suspended in a vehicle of vinyl, with the ratio of filler to vehicle solids being substantially high. A granular type rather than a leaf type aluminum is employed in order to maintain optimum adhesion and density. This active aluminum filler tends to stop any corrosive action and possible undercutting of a subsequently applied paint film or coating by producing those oxide and hydroxide complex products that tend to plug or stop the corrosive action.

The atomized aluminum is preferably carried in a vinyl type vehicle having a very low solids content with the disclosed vinyl material functioning more in the nature of an adhesive than as a continuous vinyl film. The type of vinyl preferred is a mixture of 80–90% vinyl chloride and 9½–19% vinyl acetate, polymerized to a molecular weight of 35,000 to 65,000, and ½–1% dibasic acid, such as maleic acid. Other vehicles of the phenolic or epoxy type may be employed in place of the vinyl type vehicle if they are substantially cured before the finishing material is applied.

The solids content of the primer as applied contains over 60% but preferably 80% active aluminum filler and but a relatively small amount of vinyl; for example, approximately 20% vinyl resin. The solids are fluidized with solvent to permit spray application. The primer employed is non-compatible with and will not dissolve in the top coat or coats to be subsequently applied so that the aluminum of the primer coat is prevented from bleeding through the first or undercoat into a successive second or third coat that may be applied. The base prime coat after it is applied is dried tack-free or cured before the top coat materials are applied.

The number of top coats of material applied over the base prime coat may be one, two or three coats, depending upon the coating thickness desired or required. This top coat material when applied to the interior walls of a galvanized tank is preferably sprayed onto the interior surfaces of the closed tank through one of three relatively small size openings provided therein.

The top coat material employed is a preferably two-component material, one component being a condensation resin having a solids content of 30% to 55% formed by reacting epichlorohydrin with bis-phenol and the other component is a linear polymeric polyamid of low molecular weight in the range of 10,000 to 15,000 formed by reacting a dibasic acid such as adipic acid with a diamine such as hexamethylene diamine in the presence of small amounts of a monofunctional amine, such as ethylamine. Such a material is commercially available in a solvent solution for spray application and has a solids content in the range of 40 to 55%. Since these materials normally react to form a polymer, they are not stored together or combined until they are ready to be sprayed as they can polymerize at normal room temperatures over an extended period of time and a mixture of the two may become solid when combined in a sealed can or container at those temperatures. This polymer or top coat material reacts to form a substantially continuous film on the tank surface, the rate at which it is formed depends upon the temperature at which curing is accomplished.

To this coating material which provides a translucent film, is added a pigment of preferably 1% by weight or less in order to provide an indication of coating thickness due to a comparison of color density which shows up best when a light base or prime coat material is employed. Such a pigment is preferably carbon black with each subsequent coat of such finishing material when applied appearing darker. By keeping the pigment at a relatively low amount or minimum, the excellent corrosion resisting properties of such finishing material are not altered as occurs where the quantity of inert pigmentation is relatively high; for example, over 25%.

The finishing coating comprising the two-component mixture, preferably mixed in an approximate ratio of two parts of the epon component and one part of the polymeric polyamide, has a solids content of approximately 35 to 50%. These solids are not suspended solids like a pigment or inert matter, but rather they are polymerizable solids with their high solids content permitting the application of a relatively heavy layer for each coat. To assist this process, the air for spraying is heated and is used to heat the paint or coating material as they flow through concentric tubes of the sprayer to the nozzle or point of discharge to assist in atomization.

When spraying a closed receptacle, such as a tank, the nozzle employed is preferably one capable of spraying the side walls and simultaneously in opposite directions so as to paint or coat both ends; i. e. the interior of the head and bottom of the tank as the nozzle of the spray gun is mechanically withdrawn from the tank. After the initial coat of finishing material has been applied, it is air dried to remove sufficient solvents to prevent film sagging when subsequent coats are applied and, because of the relatively low amount of solvents in the paint mixture, forced air drying may be accomplished in but approximately 6 to 8 minutes.

Additional coats of the paint mixture or finishing material may be subsequently applied in the same manner and with each coat air dried after application, after which a final baking or curing operation completes the polymerization. The bake oven is preferably operated at a temperature of approximately 150 to 350° F., with each baking cycle ranging from a minimum of approximately 40 minutes at 150° F. to a minimum of approximately 10 minutes at 350° F.

Excellent results have been obtained by applying a finishing material having a polymerizable solids content in the range of approximately 30 to 55% and a pigment content of less than 5%, said finishing material being of the epoxy-polyamide type. The aluminum in the primer or base paint is preferably limited to a solids content range of approximately 60 to 80% of the total solids with the thickness of the primer coat limited to less than one mil.

Having thus disclosed the invention, I claim:

1. The method of protecting a galvanized surface against corrosion, comprising the steps of roughening the galvanized surface to increase its surface area and to remove oxide films, applying a primer base to the roughened surface with said primer base consisting of granules of a non-leafing type aluminum suspended in a vehicle in which the ratio of aluminum granules is approximately two to four times that of the vehicle solids, applying a finishing material over said primer base, and curing said finishing material.

2. The method of protecting a galvanized surface against corrosion, comprising the steps of roughening the galvanized surface to increase its surface area and to remove oxide film, applying a primer base of granules of a non-leafing type aluminum suspended in a vehicle in which the ratio of aluminum granules is approximately two to four times that of the vehicle solids, drying said primer base, spraying the treated surface with a finishing material containing polymerizable solids, and curing said finishing material.

3. The method of protecting a galvanized surface against corrosion, comprising the steps of roughening the galvanized surface to increase its surface area and to remove oxide films, applying a primer base of granules of a non-leafing type aluminum suspended in a vehicle of the vinyl type with the granules of aluminum forming a dense dispersion of such granules throughout the primer base, applying to the treated surface a finishing material containing polymerizable solids of the epoxy-polyamide type, and curing said finishing material.

4. The method of protecting a galvanized surface against corrosion, comprising the steps of roughening the galvanized surface to increase its surface area and to remove oxide films, applying a primer base of granules of a non-leafing type aluminum suspended in a vehicle selected from the group consisting of vinyl, phenolic and epoxy type resins with the granules of aluminum being in a substantially greater amount than the non-volatile components of the vehicle, drying said primer base, spraying the treated surface with a finishing material containing polymerizable solids of the epoxy-polymeric polyamide type, and curing said finishing material.

5. The method of protecting the interior surfaces of galvanized tanks against corrosion, consisting in the steps of roughening the galvanized surfaces to be protected to increase its surface area and to remove oxide films, applying to the roughened surfaces a primer base coat comprising granules of a non-leafing type aluminum suspended in a vehicle of vinyl resin with the active aluminum filler comprising solids in the range of 60 to 80% to form a dense dispersion of such granules in the base coat, spraying the treated surfaces with a finishing material having a polymerizable solids content in the range of 30 to 55% and a pigment content of less than 5%, and curing the finishing material.

6. The method of protecting the interior surfaces of galvanized tanks against corrosion, consisting in the steps of roughening the galvanized surfaces to be protected to increase its surface area and to remove oxide films, applying to the roughened surfaces a primer base coat comprising granules of a non-leafing type aluminum suspended in a vehicle selected from the group of vinyl, phenolic and epoxy type resins with the granules of aluminum being in a substantially greater amount than the non-volatile components of the vehicle, applying to said primer base coat a finishing material having a polymerizable solids content in the range of 30 to 55% and a pigment content of less than 5%, and curing the finishing material.

7. The method of protecting the interior surfaces of galvanized tanks against corrosion, consisting in the steps of roughening the galvanized surfaces to be protected to increase its surface area and to remove oxide films, applying to the roughened surfaces a primer base coat comprising granules of a non-leafing type aluminum pigment suspended in a vehicle selected from the group of vinyl, phenolic and epoxy type resins with the active aluminum filler comprising solids in the range of 60 to 80% and applying to said primer base coat a finishing material of the epoxy-polymeric polyamide type having a polymerizable solids content in the range of 30 to 55% and a pigment content of less than 5%, and curing the coating material.

8. The method of protecting the interior surfaces of galvanized tanks against corrosion, comprising the steps of roughening the galvanized surfaces to be protected to increase its surface area and to remove oxide films, applying to the roughened surfaces a primer base coat comprising granules of a non-leafing type aluminum pigment suspended in a vehicle selected from the group of vinyl, phenolic and epoxy type resins, limiting the thickness of said primer base coat to less than 1 mil, applying to said primer base coat a finishing material of the epoxy-polymeric polyamide type having a polymerizable solids content in the range of 30 to 55% and a pigment content of less than 5%, and curing the coating material.

9. The method of protecting the interior surfaces of galvanized tanks against corrosion, comprising the steps of roughening the galvanized surfaces to be protected to increase its surface area and to remove oxide films, applying to the roughened surfaces a primer base coat comprising granules of a non-leafing type aluminum pigment suspended in a vehicle with the aluminum granules in a substantially greater amount than the non-volatile components of the vehicle, limiting the thickness of said primer base coat to less than 1 mil, applying to said primer base coat a finishing material of the epoxy-polymeric polyamide type having a polymerizable solids content in the range of 30 to 55% and a pigment content of less than 5%, and curing the coating material.

References Cited in the file of this patent

UNITED STATES PATENTS

| | | |
|---|---|---|
| 2,004,567 | Brumbaugh | June 11, 1935 |
| 2,343,925 | Pike | Mar. 14, 1944 |
| 2,366,850 | Gardner | Jan. 9, 1945 |
| 2,589,245 | Greenlee | Mar. 18, 1952 |
| 2,626,223 | Sattler | Jan. 20, 1953 |
| 2,709,664 | Evans | May 31, 1955 |
| 2,798,509 | Bergquist | July 9, 1957 |

FOREIGN PATENTS

| | | |
|---|---|---|
| 122,209 | Australia | Sept. 19, 1946 |